(12) United States Patent
Wu et al.

(10) Patent No.: US 8,599,238 B2
(45) Date of Patent: Dec. 3, 2013

(54) FACIAL POSE IMPROVEMENT WITH PERSPECTIVE DISTORTION CORRECTION

(75) Inventors: Hsi-Jung Wu, San Jose, CA (US); Chris Yoochang Chung, Sunnyvale, CA (US); Xiaojin Shi, Fremont, CA (US); James Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 12/581,043

(22) Filed: Oct. 16, 2009

(65) Prior Publication Data

US 2011/0090303 A1    Apr. 21, 2011

(51) Int. Cl.
*H04N 7/14* (2006.01)

(52) U.S. Cl.
USPC .................................. 348/14.16; 348/14.02

(58) Field of Classification Search
USPC ........... 348/14.16, 14.01, 14.02, 14.03, 14.12
See application file for complete search history.

(56) References Cited

U.S. PATENT DOCUMENTS

| | | | |
|---|---|---|---|
| 5,786,846 A * | 7/1998 | Hiroaki | 348/14.16 |
| 8,174,555 B2 * | 5/2012 | Border et al. | 348/14.16 |
| 2006/0078215 A1 | 4/2006 | Gallagher | |
| 2007/0248281 A1 | 10/2007 | Super et al. | |
| 2008/0300010 A1 | 12/2008 | Border et al. | |
| 2009/0239591 A1 | 9/2009 | Alameh et al. | |
| 2010/0149310 A1 * | 6/2010 | Zhang et al. | 348/14.16 |

FOREIGN PATENT DOCUMENTS

| | | |
|---|---|---|
| CN | 1937716 A | 3/2007 |
| CN | 101124820 A | 2/2008 |
| EP | 1768387 A1 | 3/2007 |
| WO | WO2006003066 A2 | 1/2006 |
| WO | 2008153728 A2 | 12/2008 |

OTHER PUBLICATIONS

Rozendaal, Annemieke, Authorized Officer, International Searching Authority, Application No. PCT/US2010/049350, filed Sep. 17, 2010, in International Search Report and Written Opinion, mailed Dec. 22, 2010, 15 pages.

* cited by examiner

*Primary Examiner* — Stella Woo
(74) *Attorney, Agent, or Firm* — Wong, Cabello, Lutsch, Rutherford & Brucculeri, LLP

(57) ABSTRACT

Methods, systems, and apparatus are presented for reducing distortion in an image, such as a video image. A video image can be captured by an image capture device, e.g. during a video conferencing session. Distortion correction processing, such as the application of one or more warping techniques, can be applied to the captured image to produce a distortion corrected image, which can be transmitted to one or more participants. The warping techniques can be performed in accordance with one or more warp parameters specifying a transformation of the captured image. Further, the warp parameters can be generated in accordance with an orientation of the image capture device, which can be determined based on sensor data or can be a fixed value. Additionally or alternatively, the warp parameters can be determined in accordance with a reference image or model to which the captured image should be warped.

34 Claims, 10 Drawing Sheets

FACIAL POSE IMPROVEMENT WITH PERSPECTIVE DISTORTION CORRECTION

TECHNICAL FIELD

The present disclosure relates to improving positioning and orientation of an image capture device, such as a video camera included in a mobile computing device, with respect to a subject, and to correcting distortion in captured images.

BACKGROUND

Video conferencing (or video teleconferencing) systems have been developed to permit users in two or more separate locations to conduct face-to-face discussions. Through the inclusion of video images of the participants, video conferencing can significantly enhance the effectiveness of a communication session. For example, non-verbal communication also can be exchanged and physical objects can be presented. Accordingly, video conferencing systems have been adapted to a variety of purposes, including distance learning, telemedicine, and remote collaboration.

Early video conferencing systems required dedicated communication circuits to enable the real-time transmission of video data at a rate sufficient to provide an acceptable picture quality. Further, special purpose coder/decoder (codec) systems were employed to perform the audio and video processing, and multiple monitors often were included to support multi-point conferences. Thus, early video conferencing systems were implemented as dedicated systems and were installed in fixed locations. More recently, improvements in communication networks have enabled the development of video conferencing systems using general purpose computing platforms. Improved video compression algorithms also have been developed to reduce the bandwidth requirements for video conferencing applications.

A number of factors can influence the perceived quality of a video conferencing system. For example, if the frame rate is too low, the video presentation at the receiving device can include a strobe effect. Further, for some orientations of the camera relative to the subject, the received image can include noticeable distortion. Either or both of the angle of view at which an image is captured and the angle of view at which an image is presented can affect the level of perspective distortion. Perspective distortion can result from an image being captured at a focal length that is outside of the normal range and is perceived as a visible warping of an object or objects in the captured image. Through perspective distortion, an object or a portion thereof may appear larger than normal with respect to other objects or object portions. Perspective distortion can become more noticeable as the angle of view increases and the distance between the camera and the object decreases.

SUMMARY

Distortion in images captured by a camera, e.g. in association with a video conferencing application, can be at least partially corrected. For instance, a warping algorithm can be employed to correct or compensate for at least a portion of the distortion introduced into an image during capture, e.g. as a result of proximity between the subject and the camera and/or the angle of the subject relative to the camera. By applying warping techniques to images affected by distortion, the images can be altered to give the appearance that the camera is oriented such that it is more directly aligned with the subject.

The present inventors recognized a need to correct distortion in captured images by applying warping techniques in accordance with an actual orientation or an estimated orientation of the image capture device. The present inventors also recognized a need to determine the orientation of the image capture device based on output from one or more sensors, e.g. either or both of an accelerometer and a gyroscope. Further, a need to provide feedback to a user indicating the images being captured and the correction being applied to the captured images also was recognized.

Further, the present inventors recognized a need to perform distortion correction based on a model face, e.g. a two-dimensional (2-D) or a three-dimensional (3-D) model. The model face upon which distortion correction can be based further can be representative of the subject or can be a face corresponding to a different individual. The need to perform distortion correction in accordance with facial detection information, including face location information supplied by a user, also was recognized. For instance, the user can supply face location information, e.g. a center point of the face, through a variety of input interfaces, including a touch screen interface. Further, the present inventors recognized a need to apply warp techniques to the entire captured image or only with respect to a face region. For instance, the warp techniques can be centered on a face region included in the image or applied only to the face region.

Additionally, the present inventors recognized a need to calibrate distortion correction based on a predetermined image, such as an initial image taken prior to a video conference or an ideal image representing a user's preferred appearance. The need to apply at least a minimum level of correction to remove a degree of distortion and to enhance the appearance of the captured images also was recognized. The minimum level of correction can be based on a predetermined minimum degree of tilt. Further, the need to record a position history and to perform distortion correction in accordance with the position history also was recognized. Accordingly, the techniques and apparatus described here implement algorithms for correcting at least a portion of the distortion, e.g. perspective distortion, associated with captured images, including images used in conjunction with a video conferencing system or application.

In general, in one aspect, the techniques can be implemented to include receiving a captured image, determining an orientation of a camera used to generate the captured image, computing a warp parameter based on the determined orientation of the camera, and applying, based on the computed warp parameter, one or more warp techniques to the captured image to generate a distortion corrected image.

The techniques also can be implemented such that determining an orientation further includes determining the orientation of the camera in accordance with a default orientation value. Also, the techniques can be implemented such that determining an orientation further includes determining the orientation of the camera based on sensor data. Further, the techniques can be implemented to include receiving input identifying a face location in the captured image. Additionally, the techniques can be implemented to include applying the one or more warp techniques to the captured image in accordance with the identified face location. Further, the techniques can be implemented such that receiving input identifying a face location further includes receiving input from a user defining a boundary corresponding to the face location.

In general, in another aspect, the techniques can be implemented as a computer program product, encoded on a computer-readable medium, operable to cause data processing apparatus to perform operations including receiving, from a camera, a captured image depicting a face, wherein the captured image is generated by a camera, analyzing an item of sensor data to determine an orientation of the camera, computing one or more warp parameters based on the determined orientation of the camera, and warping at least a portion of the captured image, based on the computed one or more warp parameters, to generate a distortion corrected image.

The techniques also can be implemented to include receiving the item of sensor data from a gyroscope, an accelerometer, another position or motion sensor, or any combination thereof, associated with the camera. The techniques additionally can be implemented to be further operable to cause data processing apparatus to perform operations including receiving the sensor data from an accelerometer. Further, the techniques can be implemented such that the orientation of the camera comprises an angle of tilt relative to a vertical plane, a horizontal plane, or to another reference plane. The techniques also can be implemented to be further operable to cause data processing apparatus to perform operations including receiving input from a face detection algorithm identifying a location of the depicted face. Additionally, the techniques can be implemented to be further operable to cause data processing apparatus to perform operations including warping the at least a portion of the captured image in accordance with the identified location of the depicted face.

In general, in another aspect, the subject matter can be implemented to include a camera configured to capture video images, a position sensor, and a computing system coupled to the camera and the position sensor, the computing system including one or more processors configured to perform operations including receiving, from the camera, a captured video image, receiving sensor data from the position sensor, analyzing the received sensor data to determine an orientation of the camera, computing a warp parameter based on the determined orientation of the camera, and applying, based on the computed warp parameter, one or more warp techniques to the captured video image to generate a distortion corrected image.

The techniques also can be implemented such that the one or more processors electronics are further configured to perform operations including generating the distortion corrected image in real-time. Further, the techniques can be implemented such that the position sensor comprises a gyroscope, an accelerometer, a Global Positioning System (GPS) processor, a cellular triangulation processor, another motion or position sensor, or any combination thereof. Additionally, the techniques can be implemented such that the computing system further includes a touch screen display configured to receive touch input from a user.

The techniques also can be implemented such that the one or more processors are further configured to perform operations including receiving, through the touch screen display, input from a user identifying one or more locations on a face depicted in the captured video image. Additionally, the techniques can be implemented such that the one or more processors are further configured to perform operations including applying the one or more warp techniques to the captured video image in accordance with the identified one or more locations on the face. Additionally, the techniques can be implemented such that one or more sensor data offsets associated with the position sensor can be manually configured by a user to allow the user to adjust the position sensor in different positions.

In general, in another aspect, the techniques can be implemented to include receiving a captured image, identifying one or more registration points associated with the captured image, comparing, based on the identified one or more registration points, the captured image with a reference image, determining, in response to the comparing, one or more warp parameters, and applying, based on the determined one or more warp parameters, one or more warp techniques to the captured image to generate a distortion corrected image.

In general, in another aspect, the techniques can be implemented as a computer program product, encoded on a computer-readable medium, operable to cause data processing apparatus to perform operations including receiving a captured image depicting a face, identifying one or more registration points associated with the captured image, comparing, based on the identified one or more registration points, the captured image with the reference image, determining, in response to the comparing, one or more warp parameters, and applying, based on the determined one or more warp parameters, one or more warp techniques to the captured image to generate a distortion corrected image.

The techniques described in this specification can be implemented to realize one or more of the following advantages. For example, the techniques can be implemented such that distortion in captured images can be at least partially corrected or compensated for to aesthetically improve the appearance of a video conference participant. The distortion corrected or compensated for can include distortion caused by an orientation of a camera used to capture the images relative to a subject, e.g. a face, of the images. Further, the techniques can be implemented such that corrected images generated through the application of warping techniques provide the appearance that the camera is more properly aligned with the subject. The techniques also can be implemented to determine an actual orientation of the image capture device based on positional data received from one or more included sensors.

Further, the techniques can be implemented to permit determining and analyzing the orientation of an image capture device at different points in time during a communication session. Thus, a preferred orientation can be determined based on usage data. Further, a degree of correction to be applied can be determined based on the difference between a present orientation and the preferred orientation. The techniques also can be implemented to permit determining when sensor data likely is inaccurate and to permit using a default orientation in place of the sensor data at such times. Additionally, the techniques can be implemented to permit a user to select a preferred model for use in performing warp correction. For instance, a user can select, as the preferred model, an image that represents their ideal facial depiction, including an image of another individual. Alternatively, a calibration image can be used to perform warp correction. The calibration image can be selected by a user or determined automatically.

Additionally, the techniques can be implemented to permit distortion to be corrected for an entire image or for a selected portion of an image. For instance, facial detection processing or user input can be employed to determine a face region for use in distortion correction processing. The distortion correction can be applied such that it is centered with respect to the face region. Alternatively, the distortion correction can be isolated to the face region. Further, the techniques can be implemented to permit a user to supply information defining a face region, such as through input to a touch screen.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

A computing device can be configured to perform video conferencing functions, e.g. in the context of a video conferencing application. Further, the computing device can be configured to perform one or more distortion correction operations to reduce or remove distortion included in images captured by a camera associated with the computing device. For example, the distortion correction operations can be performed in real-time or near real-time prior to generating distortion corrected images that can be transmitted in a video conferencing session. The distortion correction operations can include the application of one or more warping techniques to a captured image. The warping techniques can be implemented as one or more algorithms through which a distorted image can be adjusted, or warped, to produce a distortion corrected image. The warping techniques can be configured to adjust the distorted image in accordance with a set of one or more warp parameters. The set of one or more warp parameters can mathematically represent a transformation (or translation) of an image from the perspective at which it was captured to a target perspective. Further, a set of one or more warp parameters can be defined to transform an image with respect to one, two, or three dimensions.

Figure 1:
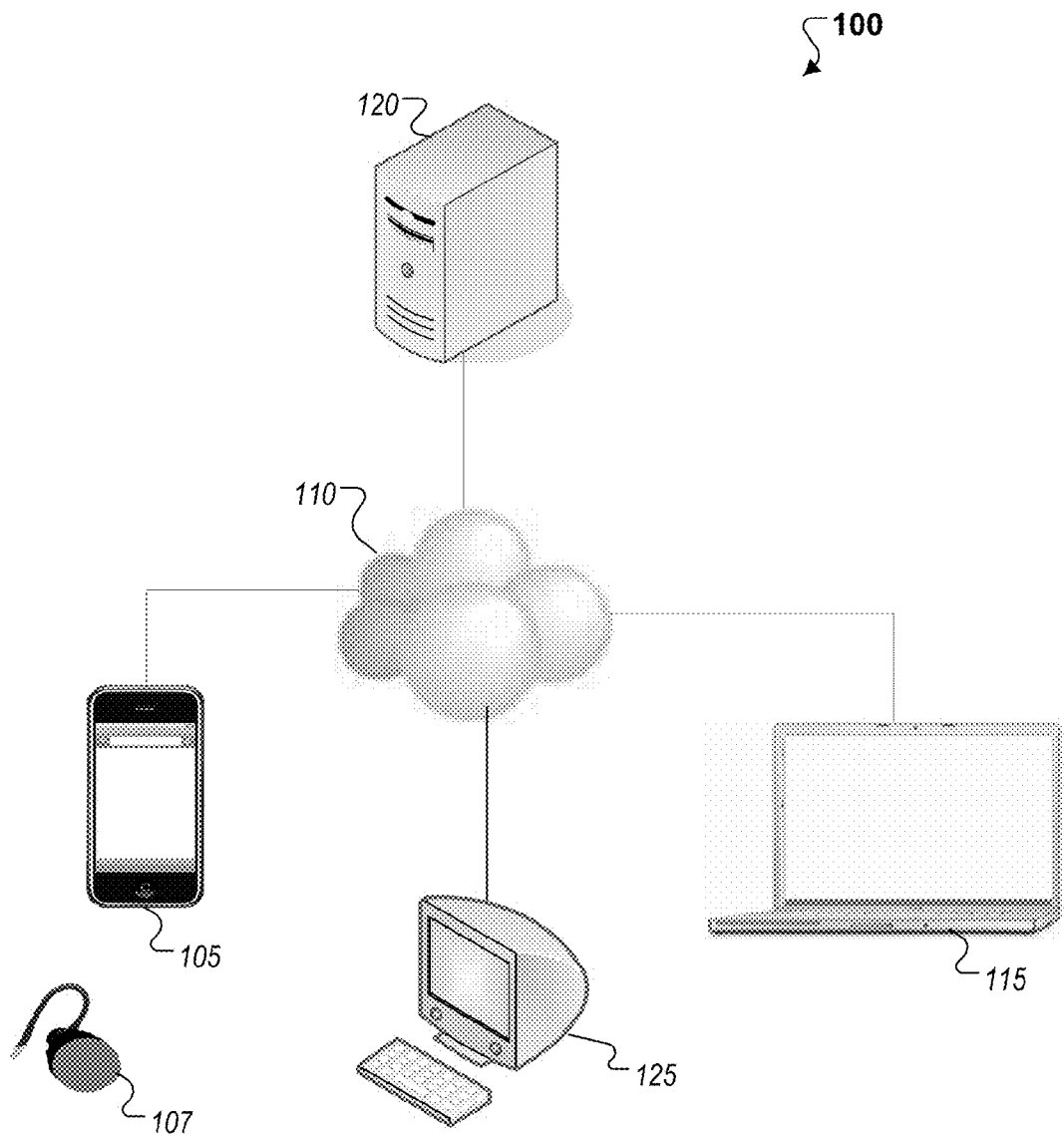
FIG. 1 shows an exemplary computing environment including computing devices configured to perform video conferencing.

FIG. 1 shows an exemplary computing environment including computing devices configured to perform and/or facilitate video conferencing. Computing environment 100 can be a heterogeneous, distributed computing environment that includes distinct computing systems, such as mobile computing devices (e.g., mobile phone 105 and laptop 115), desktop 125, and server 120, which can be separated by any distance. The computing systems included in computing environment 100 can be configured to communicate bi-directionally over a network 110. Network 110 can be any type of communication network, including a local area network ("LAN"), such as an intranet, a wide area network ("WAN"), such as the internet, or a combination of local and wide area networks. Further, network 110 can include either or both of public network segments and private network segments, which can be implemented using any number of wired communication paths and/or wireless communication paths associated with one or more service providers. Also, access to network 110 can be provided through any architecture, including mobile data networking architectures, e.g. based on 3G/4G standards, wireless data networking access points, e.g. based on the IEEE 802.11 standards, and wired network connections. Additionally, network 110 can be configured to support the transmission of messages formatted using any of a variety of protocols.

Mobile computing device 105 can be any type of mobile computing device configured to access a data network, including a smart phone, a personal digital assistant (PDA), a palm-top computing device, a tablet computing device, a laptop, etc. In one implementation, mobile computing device 105 can be an iPhone, manufactured by Apple Inc. of Cupertino, Calif. Further, mobile computing device 105 can include one or more network interfaces for accessing a data network, such as network 110. For instance, mobile computing device 105 can include either or both of a mobile data network interface, e.g. a 3G interface, for communicating over a telecommunications network and a wireless data network interface for wirelessly accessing a data network, e.g. through a Wi-Fi access point. Additionally, mobile computing device 105 can include one or more processors, memories, and buses, configured to execute applications, including one or more video conferencing (or video chat) applications.

A camera adapted to capture video, e.g. at a Video Graphics Array (VGA) resolution and at a rate of 30 frames per second, also can be associated with mobile computing device 105. In some implementations, the camera can be configured to capture individual still images in addition to video. The camera can be embedded in mobile computing device 105 or can be an external device that can be attached to mobile computing device 105, e.g. through a wired or wireless connection. Further, mobile computing device 105 can include a display configured to present user interfaces and application data, including one or more images corresponding to the captured video. The display can be of any type adapted for use in a mobile device, including a liquid crystal display (LCD), an organic light emitting diode (OLED) display, a light emitting polymer (LEP) display, and an organic electro luminescence (OEL) display. In some implementations, the display also can be implemented as a touch screen configured to receive touch input, including gestures, from a user. Both the camera and the display can be oriented to simultaneously face the user. Additionally, mobile computing device 105 can include one or more position sensors, such as a gyroscope, an accelerometer, a GPS processor, and/or a cellular triangulation processor.

In some implementations, mobile computing device 105, e.g. a smartphone, can be configured to communicate with a headset 107 including one or more embedded position sensors, such as an accelerometer or a gyroscope. Headset 107 can be configured to output sensor data to mobile computing device 105 over a wireless communication link, such as a radio frequency link. The sensor data can be used to determine an orientation of the user's head relative to mobile computing device 105. Thus, the sensor data and/or determined orientation of the user's head can be used to generate or refine one or more warp parameters. Further, the user can be instructed to wear headset 107 in a particular position, such that sensor data generated by headset 107 consistently represents an orientation of the user's head and positional changes. Additionally or alternatively, one or more sensor data offsets associated with headset 107 can be manually configured, such that the user can wear the headset in a different position.

Mobile computing device 115 also can include one or more network interfaces for accessing a data network, such as network 110. For instance, mobile computing device 115 can include a wireless data network interface for wirelessly accessing a data network, e.g. through a Wi-Fi access point, and a wired data network interface, e.g. an Ethernet port. In some implementations, mobile computing device 115 also can include a mobile data network interface, e.g. a 3G interface, for communicating over a wireless telecommunications network. Mobile computing device 115 further can include a camera (not shown) adapted to capture video, e.g. at VGA resolution and at a rate of 30 frames per second. In some implementations, the camera can be configured to capture individual still images in addition to video. The camera can be integrated with mobile computing device 115 or implemented as an external accessory that can be coupled to mobile computing device 115, e.g. through a Universal Serial Bus (USB) connector.

Mobile computing device 115 further can be configured to present user interfaces and application data, including one or more images corresponding to the captured video, on a display device. The display can be of any type, including an LCD, OLED, LEP, and OEL display. In some implementations, the display also can be implemented as a touch screen configured to receive touch input, including gestures, from a user. Mobile computing device 115 also can include one or more position sensors, such as a gyroscope, an accelerometer, a GPS processor, and/or a cellular triangulation processor. Further, mobile computing device 115 can include one or more processors, memories, and buses, configured to execute applications, including one or more video conferencing applications. Thus, mobile computing device 115 can engage in a video conferencing session with a remote computing device, such as mobile computing device 105. In some implementations, mobile computing device 115, e.g. a laptop, can be replaced by a different computing device that includes the same or similar features and functionality, including a desktop, a work station, a mini-computer, a micro-computer, a mobile phone, a tablet computing device, and a special purpose computing device.

Additionally, server 120 can be configured to facilitate video conferencing, such as by assisting the participating systems, e.g. mobile computing devices 105 and 115, with an initial connection. Server 120 can provide directory, authentication, and billing services, and can communicate using multiple protocols. In some implementations, computing environment 100 can include one or more additional computing devices configured to perform and participate in video conferencing, including desktops, work stations, mini-computers, micro-computers, tablet computing devices, special purpose computing devices, and additional mobile computing devices.

Figure 2:
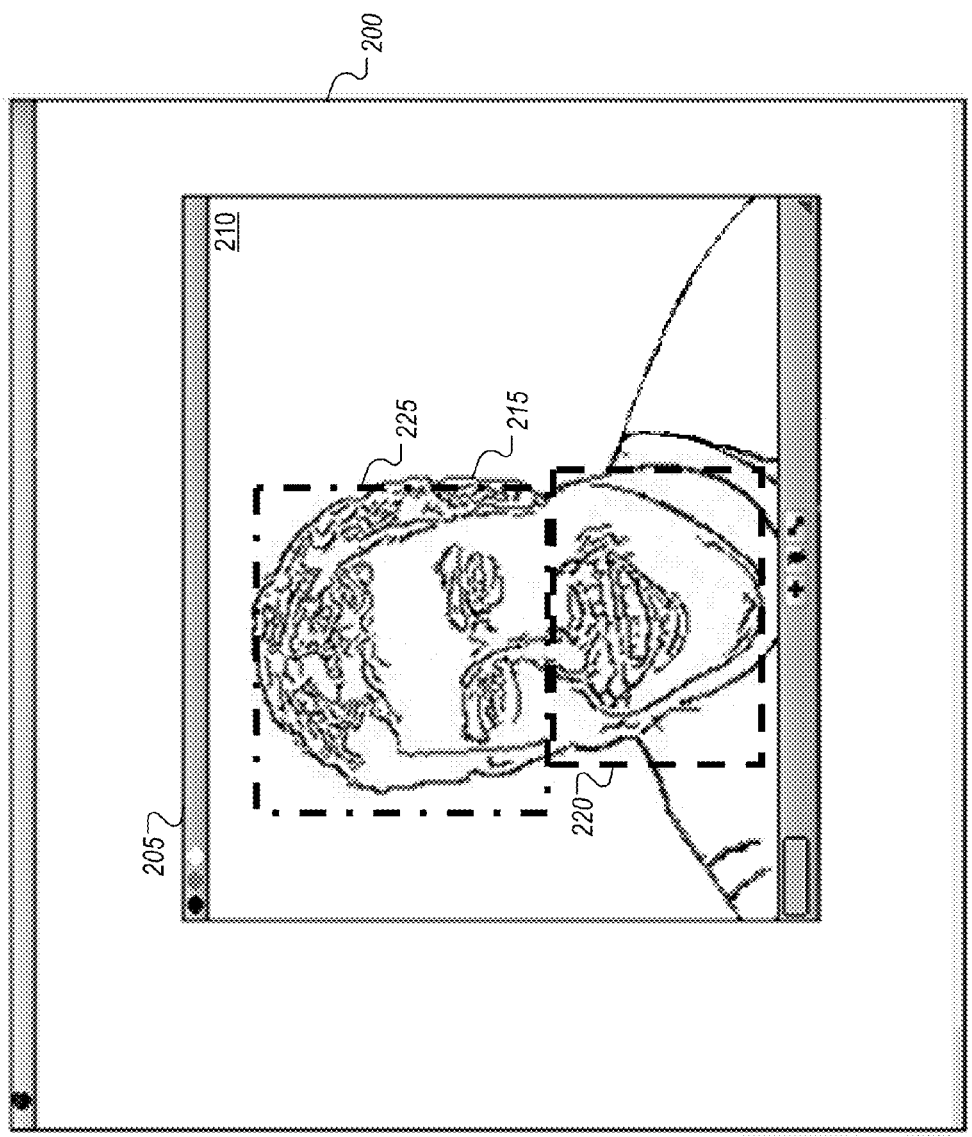
FIGS. 2 and 3 show exemplary captured images presented in an image capture application.

FIG. 2 shows an exemplary captured image presented in an image capture application. A user interface 200 generated by an operating system can be presented on the display of a computing device, such as mobile computing device 105 or 115. User interface 200 can be configured to present graphical information corresponding to one or more applications being executed within the operating system framework. For instance, a video conferencing window 205 associated with a video conferencing application can be displayed in user interface 200.

In some implementations, video conferencing window 205 can be configured to display one or more preview images 210 corresponding to video data captured by the computing system on which the video conferencing application is executing. The one or more preview images 210 can depict an uncorrected video image showing the subject of the image data being captured, e.g. the face of a user, by a camera in association with the video conferencing application. In some implementations, the one or more preview images 210 can be presented as video data that is representative of the images that are or would be transmitted to one or more other video conference participants. In other implementations, the one or more preview images 210 can be presented as one or more still images, e.g. that are refreshed less frequently than video images or that can be manually advanced. The one or more preview images 210 can permit the user to evaluate characteristics of the images being captured by the camera, including the angle(s) of the camera relative to the subject and the distance of the camera from the subject (e.g., the subject's face).

Distortion in the images captured by the camera can be detected in the one or more preview images 210. For example, the camera can be located below the subject's face 215 and oriented such that it is tilted upward. As a result, perspective distortion can cause a lower portion 220 of the subject's face 215 to appear to be more broad. An upper portion 225 of the subject's face 215 also can be distorted such that it appears to be more narrow. Further, other distortions and optical aberrations also can be detected, including distortions caused by a relative angle between the camera and the subject's face 215 in a reference plane, e.g. the horizontal plane. Based on the one or more preview images 210, the orientation between the camera and the subject's face can be adjusted.

Figure 3:
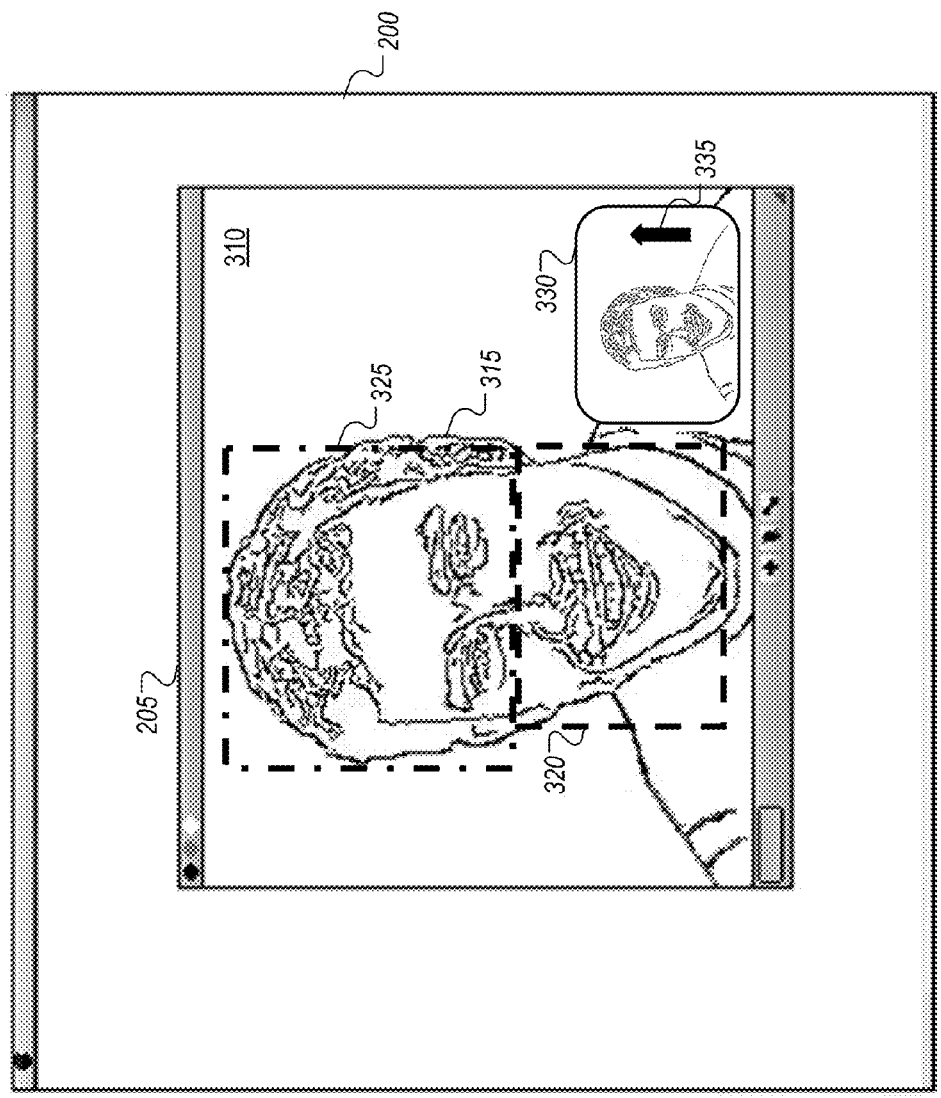

FIG. 3 shows another exemplary captured image presented in an image capture application. Video conferencing window 205 in user interface 200 also can be configured to display one or more distortion corrected images 310, which correspond to captured images that have been processed to correct or compensate for, at least partially, distortion. The distortion can be caused by factors such as the orientation of the camera with respect to the subject and the focal length of the camera. The one or more distortion corrected images 310 can be generated by applying warping techniques to the captured images. Further, the warping techniques and the degree of correction applied can be determined in accordance with one or more factors, including a determined orientation of the camera and a distance between the camera and the subject.

The dimensions of the subject's face 315, as depicted in the one or more distortion corrected images 310, can be more consistent with the actual dimensions. For example, the warping techniques can be applied to narrow the lower portion 320 of the subject's face 315. Further, the warping techniques can be applied to broaden the upper portion 325 of the subject's face 315. The one or more distortion corrected images 310 can be generated in real-time or near real-time. Additionally, the one or more distortion corrected images 310 can be presented before a video conferencing session is initiated and/or during a video conferencing session.

In some implementations, video conferencing window 205 can be configured to include a preview window 330 in which the one or more distortion corrected images 310 can be presented. Preview window 330 can be persistently presented, such that the one or more distortion corrected images 310 can be displayed throughout a video conferencing session. Alternatively, preview window 330 can be turned on/off during a video conferencing session, such as in response to user input. Further, preview window 330 can be repositioned to any portion of video conferencing window 205, either in response to user input or automatically, e.g. in response to determining a location of a face in video conferencing window 205. In some other implementations, the content of video conferencing window 205 and preview window 330 can be selected, such as in response to user input. Thus, the one or more distortion corrected images 310 can be selectively displayed in either video conferencing window 205 or preview window 330.

Additionally, in some implementations, a preferred orientation for the image capture device can be determined. For instance, the preferred orientation can be specified by a user, e.g. before or during a video conference session. The preferred orientation also can be determined automatically, e.g. based on a learned usage pattern for a user. For instance, a device orientation history can be analyzed to determine, for a given user, a preferred orientation of the image capture device. During a video conferencing session, the actual image capture device orientation can be compared with the preferred image capture device orientation to determine one or more degrees of difference. If a determined degree of difference exceeds a difference threshold, an orientation indicator can be provided to coach the user to alter the image capture device orientation to more closely approximate the preferred orientation. The indicator can be visual, auditory, haptic, or any combination thereof. For example, orientation indicator 335 can be presented in preview window 330 to coach the user to raise the image capture device. The orientation indicator can identify a direction of correction and/or a magnitude of correction, e.g. based on the presentation size, frequency, or duration. Further, the orientation indicator can be one-dimensional or multi-dimensional. Also, in some implementations, warping techniques can be applied only when one or more degrees of difference between the actual image capture device orientation and the preferred image capture device orientation exceeds a threshold, e.g. the difference threshold.

The orientation indicator also can be displayed in other image capture implementations. For instance, a user can capture video images depicting the face of another subject. An orientation indicator can be presented to the user to identify one or more directions and magnitudes of correction to cause the orientation of the image capture device to approximate a preferred orientation. Thus, the visual and/or aesthetic quality of the captured images can be increased.

Distortion, e.g. perspective distortion, can be at least partially corrected in captured images, including still and video images. Further, the distortion correction can be performed by an application for which the images are captured or by a separate, associated application. In some implementations, the video capture application can be a video conferencing or video chat application.

Figure 4:
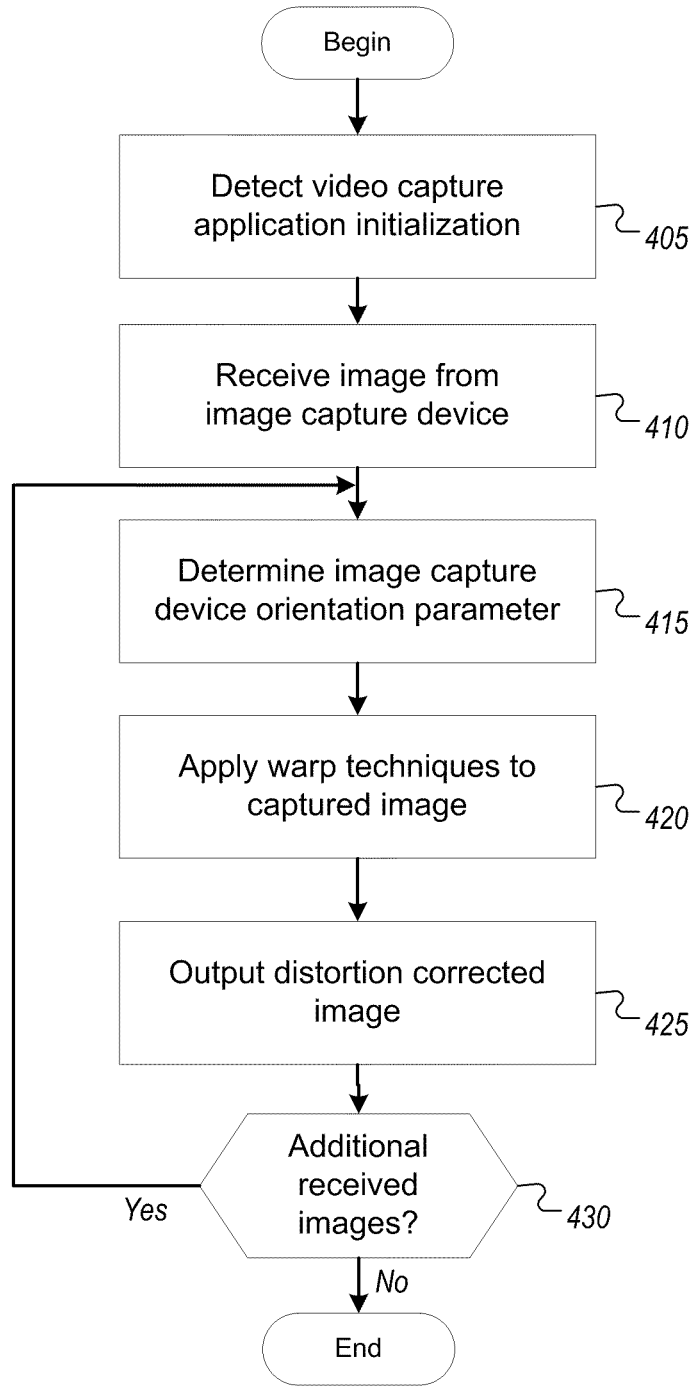
FIG. 4 shows a flow diagram for an exemplary distortion correction process using a fixed orientation parameter.

FIG. 4 shows a flow diagram for an exemplary distortion correction process using a fixed orientation parameter. In some implementations, the fixed orientation value can be expressed as one or more angles, e.g. with respect to one or more reference planes. In some other implementations, the fixed orientation value can be expressed as one or more coordinates, or as a combination of one or more angles and one or more coordinates. Initialization of a video capture application can be detected (405). For example, a user can launch a video conferencing application through an operating system interface presented by a computing device. Alternatively, a video conferencing application can be initialized automatically in response to a received video conference request from a separate computing system.

An image capture device, e.g. an embedded camera, can begin capturing image data. For instance, the image capture device can be configured to capture video data at a VGA resolution and a rate of 30 frames per second. Other resolutions and frame rates also can be used, and either or both of the resolution and frame rate can be selected manually, in response to user input, or automatically, e.g. in response to available system resources. The image data can be representative of a user of the computing device with which the image capture device is associated. An image can be received from the image capture device (410). For example, the image can be received by the video conferencing application. Received images can be stored individually, such as in separate image buffers. Alternatively, image location data indicating a storage location of one or more images can be received. In some implementations, one or more images also can be received by a separate distortion correction application or module.

An orientation parameter corresponding to the image capture device can be determined (415). The orientation parameter can be a default value, such as a fixed angle of tilt relative to a reference plane (e.g., the vertical plane). Further, the orientation parameter can be selected based on the device type. For instance, the orientation parameter associated with a smartphone having an embedded camera can be set to a first default value, such as 30 degrees of up-tilt with respect to the vertical plane, while the orientation parameter for a laptop and corresponding camera can be set to a second default value, such as 15 degrees of up-tilt with respect to the vertical plane. The orientation parameter for an image capture device can be set equal to any value, including multi-dimensional values. Further, the orientation parameter for a particular device or device type can be determined empirically.

One or more warp techniques can be applied to the captured images (420). The warp techniques can be based on a known real-time or near real-time warping algorithm, such as an affine warping algorithm or a perspective warping algorithm. The warp techniques can be applied in accordance with the orientation parameter. For instance, the degree to which an image is warped can be selected based on the severity of one or more angles, such as the angle of tilt with respect to the vertical plane. Further, the one or more warping effects applied can be selected based on the direction of one or more angles, such as whether the image capture device is tilted up or down. In some implementations, the amount of distortion correction applied to a captured image can be less than an amount of distortion estimated based on the orientation parameter, such that only a portion of the distortion is corrected. Thus, the amount of computation performed to apply the warp techniques can be constrained and over-warping can be prevented. Additionally, the warping techniques can be applied such that there is consistency in the distortion correction performed with respect to neighboring images in a video sequence. Thus, jitter or noise in a sequence of images that is associated with the application of warping techniques can be reduced or eliminated.

The captured image to which the warp techniques have been applied can be output as a distortion corrected image (425). For instance, the distortion corrected image can be output to a display interface for presentation on a local display device and/or to a communication interface for transmission to one or more remote video conference participants. It also can be determined whether one or more additional captured images have been received (430). If no other captured images have been received, the distortion correction process can be terminated. Alternatively, if an additional captured image has been received, an orientation parameter of the image capture device can be determined (415). In some implementations, the orientation parameter can be altered during the video conferencing session, e.g. in response to user input. In some other implementations, the originally determined orientation parameter can be used for an entire video conferencing session.

Figure 5:
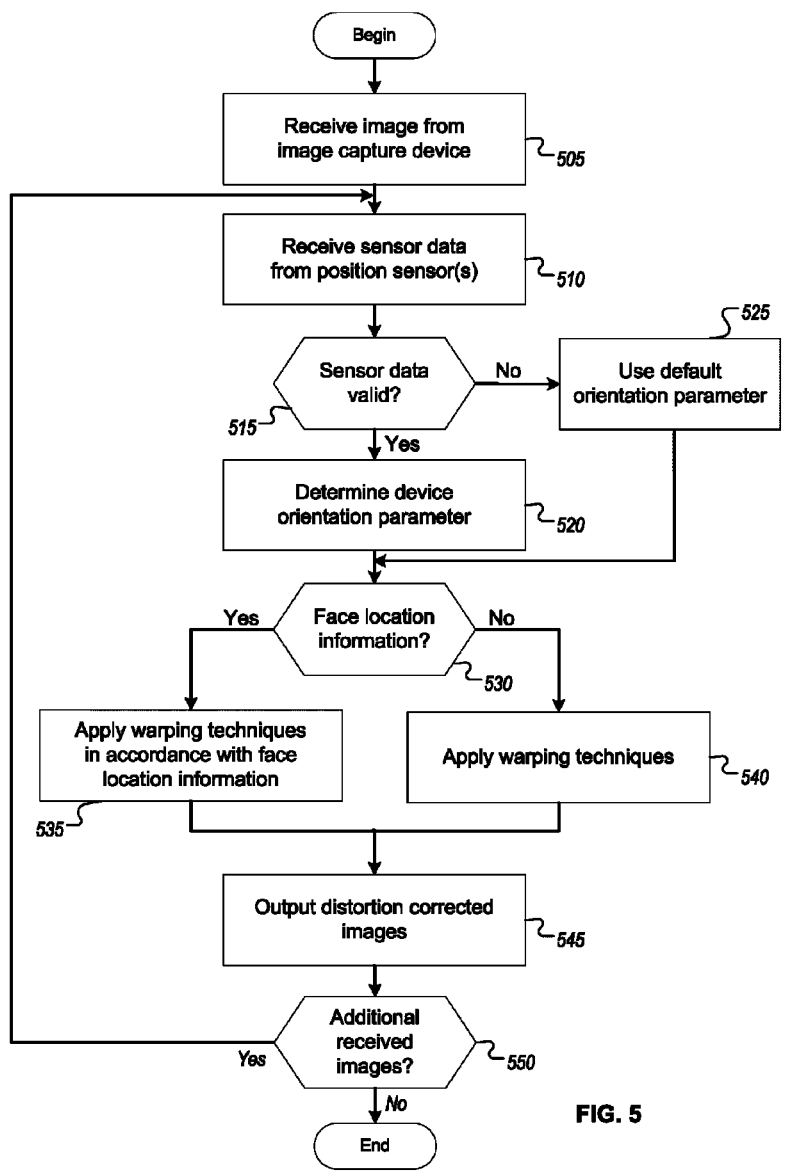
FIG. 5 shows a flow diagram for an exemplary distortion correction process using an orientation parameter determined in accordance with sensor data.

FIG. 5 shows a flow diagram for an exemplary distortion correction process using an orientation parameter determined in accordance with sensor data. An image can be received from the image capture device (505). For instance, the image can be received by a video conferencing application or a portion, e.g. a module, thereof. Received images can be stored individually, such as in separate image buffers. Alternatively, image location data indicating a storage location of one or more received images can be received. In some implementations, one or more images also can be received by a separate distortion correction application or module.

Further, sensor data can be received from one or more position sensors (510). For example, the one or more position sensors can include one or more of a gyroscope, an accelerometer, a GPS processor, and a cellular triangulation processor, which can be embedded in or otherwise associated with an object including the image capture device. A gyroscope can be configured to output signal data indicating a direction or angle, e.g. in 3-D space, which can be used to determine the orientation of the image capture device. An accelerometer can output vector data indicating a magnitude and direction of acceleration the corresponding device is experiencing. In some implementations, sensor data also can be received from an external device, e.g. a headset, associated with the image capture device.

Optionally, the sensor data can be recorded in memory. In some implementations, the sensor data corresponding to a video conference can be recorded in volatile memory and purged when the video conference terminates. In some other implementations, the sensor data can be persistently stored, such as in a data file. Sensor data can be stored in a separate file for each event, e.g. video conference, or in a file that includes data corresponding to multiple events. Further, the received sensor data can be examined to determine whether it is valid (515). For instance, valid sensor data can be constrained to a predetermined range of motion that is allowable over a corresponding duration. If the sensor data exceeds the predetermined range of motion for the defined duration, it can be determined that the sensor data is invalid. Thus, sensor data attributable to the motion of a conveyance, such as a car or an elevator, can be identified and removed from consideration. Also, in some implementations, high frequency components associated with filter data can be filtered.

If the sensor data is determined to be valid, the value of an orientation parameter indicating an orientation of the image capture device can be determined (520). The value of the orientation parameter can be determined in accordance with all of the sensor data or a subset thereof. For example, if only a portion of the sensor data is valid, the valid portion can be used to determine the value of the orientation parameter. In some implementations, the orientation parameter can represent the position of the image capture device in three-dimensional space. In some other implementations, the orientation parameter can represent one or more aspects of device orientation, e.g. a degree of tilt with respect to the vertical plane and/or a degree of rotation with respect to the horizontal plane. Further, in some implementations, the sensor data also can indicate the orientation of a user's head relative to the image capture device.

If the sensor data is determined not to be valid, a default orientation parameter can be used (525). In some implementations, the default orientation parameter can be a predetermined value determined based on a fixed orientation, such as a tilt of 25 degrees with respect to the vertical plane. In some other implementations, the default orientation parameter can be determined based on one or more items of historical sensor data. For example, the default orientation parameter can be set equal to a user preferred orientation.

It further can be determined whether one or more items of face location information are available (530). Face location information can identify the location of a face within a captured image. In some implementations, face location information can be generated by a face detection application or module. For example, face location information can be provided by the OKAO Vision face detection technology distributed by OMRON Corporation. In some other implementations, face location information can be supplied by a user, who can be prompted to provide input identifying the location of a face in one or more captured images. For example, a user can provide input to a touch screen identifying a facial boundary or a facial feature.

If face location information is available, the warping techniques can be applied in accordance with the face location information (535). In some implementations, the warping techniques can be applied such that the warping effects are centered on the face location in a captured image. In some other implementations, the warping techniques can be limited to an identified face region within a captured image. Alternatively, if face location information is not available, the warping techniques can be applied to an entire captured image without respect to a face location (540). In some implementations, when face location information is available, the area corresponding to the face location also can be evaluated to determine whether the face is of sufficient size for the application of warping techniques. If the face location is of sufficient size, the warping techniques can be applied, e.g. such that the warping effects are centered on the face location. Alternatively, if the face location is not of sufficient size, the warping techniques can be applied to the entire captured image.

Additionally, the warping techniques can be applied to a sequence of images, e.g. a video sequence, such that there is consistency in the distortion correction performed over time. Consistency of distortion correction with respect to the time domain can reduce or eliminate the appearance of jitter or noise in a time-based sequence of images. The warping techniques can be consistently applied through several mechanisms, including one or more of filtering warp parameters, filtering sensor data, and adjusting a precise set of warp parameters over time.

Warp parameters corresponding to a number of consecutive frames of an image sequence, e.g. 5 frames, can be smoothed through filtering. The filtering can be performed iteratively, with respect to a current frame being processed. For instance, the current frame of the sequence can be filtered in conjunction with either or both of past frames and future frames, e.g. obtained from a look-ahead buffer. Further, the frames of the image sequence can be low pass filtered, such as using a symmetric filter or an infinite impulse response (IIR) filter. The sensor data also can be low pass filtered with respect to time. For instance, a Gaussian filter can be used to smooth sensor data over time, thereby removing small jitter occurring between frames of the image sequence. Additionally, a set of precise warp parameters can be generated through a high-accuracy calculation. The set of precise warp parameters can be generated once, e.g. at the initiation of a video capture event, or periodically, e.g. every 1 or 5 seconds. Thus, the computational burden of generating the precise warp parameters can be reduced. Further, the precise warp parameters can be tracked, or adjusted over time, by making modifications in response to received sensor data.

The captured image to which the warp techniques have been applied can be output as a distortion corrected image (545). For instance, the distortion corrected image can be output to a display interface for presentation on a local display device and/or to a communication interface for transmission to one or more remote video conference participants. It also can be determined whether one or more additional captured images have been received (550). If no other captured images have been received, the distortion correction process can be terminated. Alternatively, if an additional captured image has been received, corresponding sensor data can be received from one or more position sensors (510). In some implementations, sensor data can be received for each image, as the orientation of the corresponding device can change over the duration of one or more images. For instance, the corresponding device can be hand-held mobile computing device and the user can intentionally or inadvertently change the orientation of the device by moving. In some other implementations, sensor data can be received periodically, e.g. once a second or once every fifteen seconds.

Figure 6:
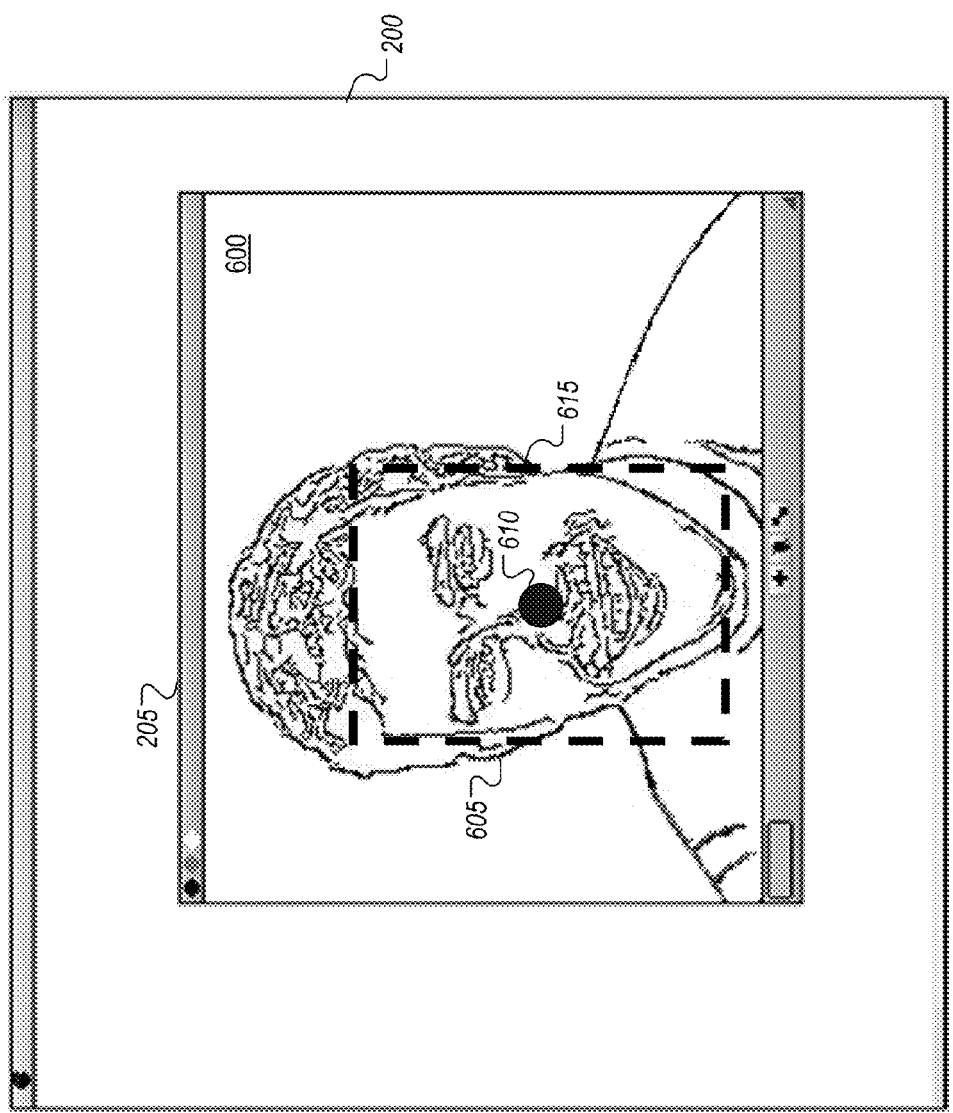
FIG. 6 shows an exemplary captured image including an identification of face location information.

FIG. 6 shows an exemplary captured image including an identification of face location information. A user can be prompted to provide an indication of a face location with respect to a captured image. For instance, video conferencing window 205 in user interface 200 can be configured to present a captured image 600, which can include a depiction of a face 605. A user can provide input, e.g. to a touch screen, indicating a center point 610 of the depicted face 605. Alternatively, the user can provide input defining a boundary 615 around the depicted face 605. Boundary 615 can be drawn such that it contains substantially all of the face region. Boundary 615 also can be evaluated to determine whether face 605 is within a size range for which distortion, e.g. perspective distortion, can be corrected through the application of warping techniques. Moreover, in some implementations, the user can be prompted to identify one or more facial features corresponding to face 605, such as the eyes, nose, and/or mouth. As discussed with respect to FIG. 5, the user-identified face location information can be used in applying warping techniques to one or more captured images, including captured image 600.

Figure 7:
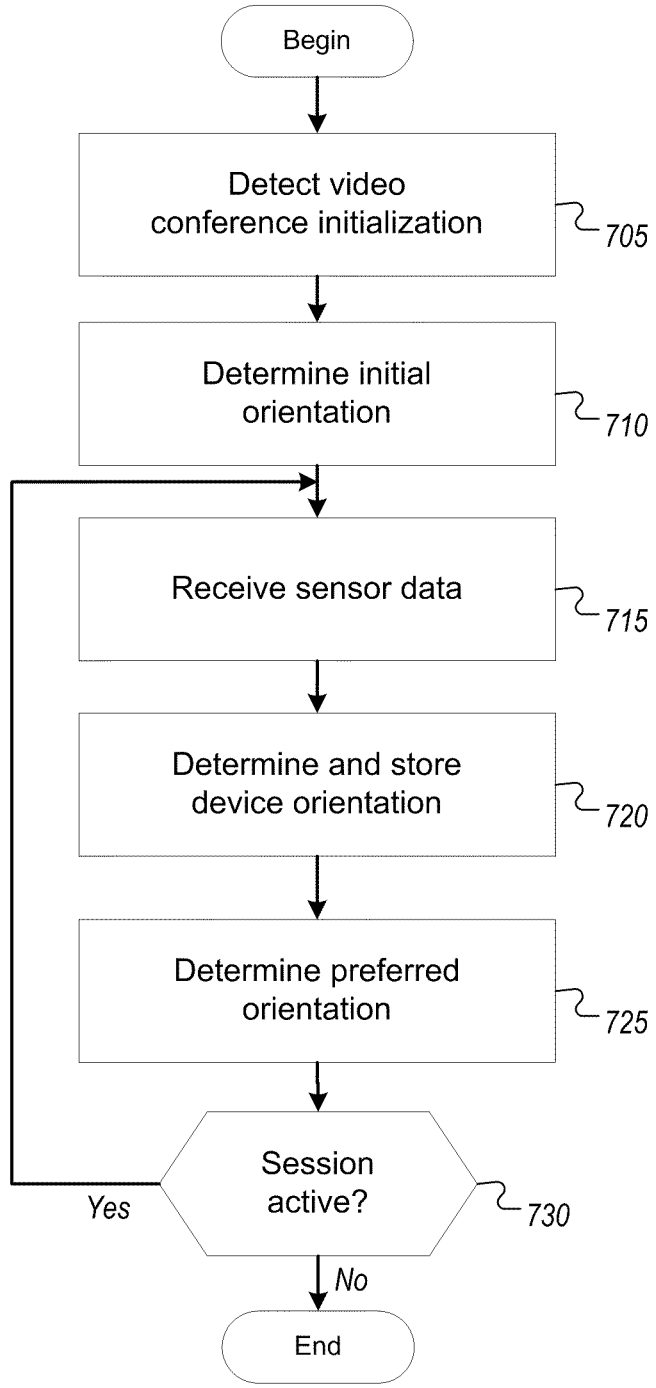
FIG. 7 shows a flow diagram describing an exemplary process for generating a device orientation history.

FIG. 7 shows a flow diagram describing an exemplary process for generating a device orientation history. Initialization of a video conference can be detected (705). The video conference can be initialized in response to user input establishing a new video conference. Alternatively, the video conference can be initialized in response to receiving a request to join a video conference from one or more remote devices. The initial orientation of the image capture device also can be determined and recorded in a device orientation history, e.g. as the first entry (710).

Further, sensor data can be received from one or more position sensors corresponding to the image capture device (715). The position sensors can include either or both of a gyroscope and an accelerometer. In some implementations, the position sensors can include one or more sensors configured to determine a location, such as a Global Positioning System (GPS) processor or a cellular triangulation processor. The location-based data can be used to determine whether and to what extent the image capture device was in motion during the video conferencing session.

The device orientation can be determined based on the received sensor data and the determined orientation can be stored in the device orientation history (720). Alternatively or additionally, position sensor data can be stored, e.g., in the device orientation history. In some implementations, the device orientation history can be stored in a file corresponding to a single video conferencing session. In some other implementations, the determined orientation can be stored in a file that spans multiple video conferencing sessions.

Further, stored device orientation information can be used to determine a preferred orientation (725). The preferred orientation can represent a favored orientation of the image capture device, e.g. relative to the user, such as an orientation that results in an image that is pleasing to the user. For instance, the device orientation can be analyzed to determine an orientation at which the image capture device is most frequently maintained. Alternatively, the device orientation can be analyzed to determine an orientation to which a user returns the image capture device, particularly an orientation that aligns the image capture device with a spatial reference, such as the vertical plane. For instance, the device orientation information can indicate an orientation near vertical that the user repeatedly approaches during a video conference and a decay from that orientation over time. Based on the device orientation history, the orientation near vertical can be identified as the preferred orientation.

The preferred orientation can be utilized in the application of warp techniques to generate a distortion corrected image. For example, the preferred orientation can indicate the orientation of the image capture device at which images should be captured. Thus, one or more warp parameters used to generate a distortion corrected image can be derived based on the difference between the actual orientation at which an image is captured and the preferred orientation. In some implementations, information relating to the decay, over time, of the orientation also can be used when sensor data is not available. For instance, the information relating to the decay can be used to determine one or more warp parameters to be applied in warping a captured image.

The preferred orientation can be updated as additional device orientation information is determined. For example, the device orientation history can be analyzed periodically during the video conferencing session to update the preferred orientation. Additionally or alternatively, device orientation information can be buffered during a video conferencing session. The buffered device orientation information can be analyzed subsequently, e.g. to update a preferred orientation. The status of the video conferencing session also can be periodically assessed. If the video conferencing session remains active (730), additional sensor data can be received (715). Otherwise, the device orientation history can be closed.

Figure 8:
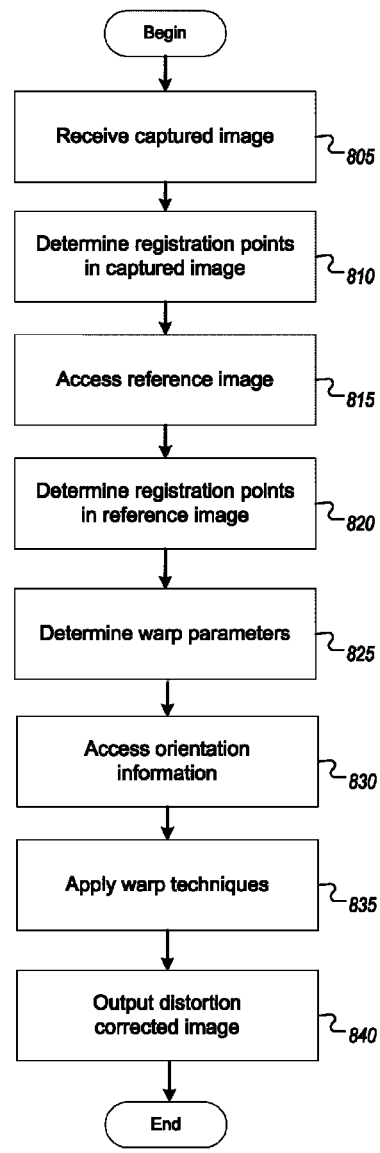
FIG. 8 shows a flow diagram for an exemplary distortion correction process using a reference image.

FIG. 8 shows a flow diagram for an exemplary distortion correction process using a reference image. A captured image can be received (805). For instance, the captured image can be a video image (or video frame) output from a camera. Further, the capture image can be received in an application configured to perform a distortion correction process, such as through the application of warping techniques to the capture image. One or more registration points can be determined in the captured image (810). The one or more registration points can be selected to facilitate the alignment of the captured image with one or more additional images, such as a reference image. In some implementations, four registration points corresponding to the corners of the eyes the corners of the mouth can be selected. In some other implementations, more, fewer, and/or different registration points can be selected. The registration points in the captured image can be determined automatically or manually. For instance, one or more registration points can be automatically determined in accordance with face location information generated by the OKAO Vision face detection technology. The face location information can include data indicating points in a detected face, such as the corners of eyes, a nose, and the corners of a mouth. Further, the captured image can be presented to a user, who can manually provide input identifying one or more registration points. For example, the user can indicate the location of one or more registration points through a cursor or touch screen interface.

Further, a reference image can be accessed (815). The reference image can be predetermined for use in performing a distortion correction process. For example, the degree to which the captured image is warped can be determined based on the reference image. Also, the reference image can be selected to have a resolution comparable to the captured image. For instance, multiple versions of a reference image can be created, each having a different resolution. The reference image closest in resolution to the captured image can be accessed.

In some implementations, the reference image can be of the subject depicted in the captured image. For instance, the reference image can be taken prior to, or at the initiation of, a video capture session to serve as a calibration measure. The reference image can be taken when the alignment between the subject and the camera is within a predetermined range, e.g. within a predetermined tilt relative to the vertical plane, such that a level of distortion in the reference image is acceptable. The reference image also can be selected by the user as a preferred image that represents an appearance the user likes.

In some other implementations, the reference image can be an image that depicts a face that does not correspond to the subject of the captured image. For instance, the reference image can depict a celebrity or a model whom the subject of the captured image would like to more closely resemble. Alternatively, the reference image can correspond to a composite face that can serve as a template for determining one or more warp parameters. Moreover, in some implementations, the reference image can be replaced by a 2-D or 3-D reference model.

One or more registration points also can be determined in the reference image (820). The one or more registration points can correspond to the registration points in the captured image. Also, the one or more registration points in the reference image can be determined automatically or manually. Further, the captured image and the reference image can be aligned and one or more warp parameters can be determined (825). For example, the warp parameters can be determined to cause the captured image to approximate the reference image with respect to one or more dimensions and/or characteristics.

Further, orientation information corresponding to the camera that generated the captured image can be accessed (830). The orientation information can be based on one or more of sensor data, preferred orientation data, and historical orientation data. The orientation information can be used to verify or refine the determined warp parameters, or to determine one or more additional warp parameters. Alternatively, in some implementations, the warp parameters determined based on the reference image can be used without consideration of the orientation information. In some implementations, a captured image also can be analyzed to identify one or more objects in the background of the image that should be characterized by parallel lines, e.g. walls, doors, frames, and buildings. The identified objects can be analyzed, e.g. to identify a degree of curvature or distortion, and used to determine, verify, or refine one or more warp parameters associated with the captured image.

Warp techniques can be applied to the captured image based on the determined warp parameters (835). Applying the warp techniques can correct, at least partially, distortion associated with the captured image to generate a distortion corrected image. Further, the resulting distortion corrected image can be output (840). For instance, the distortion corrected image can be output to a display interface for presentation on an associated display device, e.g. as a preview image, and/or to a communication interface for transmission to a remote device, e.g. for use in a video conference. The distortion correction process using a reference image can be performed in real-time or near real-time for a sequence of captured images.

Figure 9A:
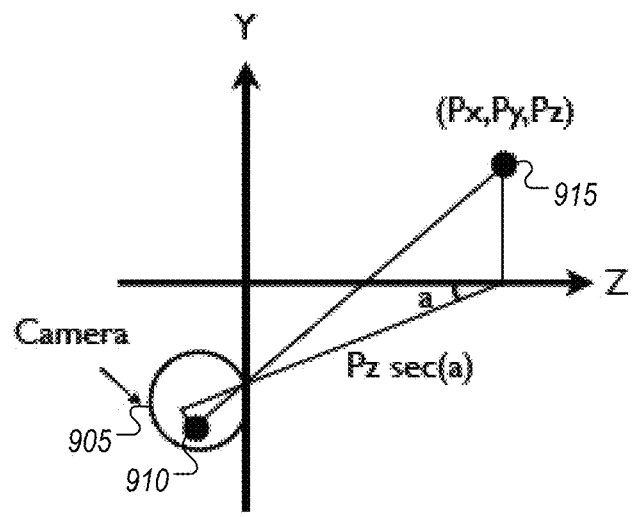
FIGS. 9A and 9B illustrate an example of the perspective distortion caused by the angle between a camera and a subject of a captured image.
Figure 9B:
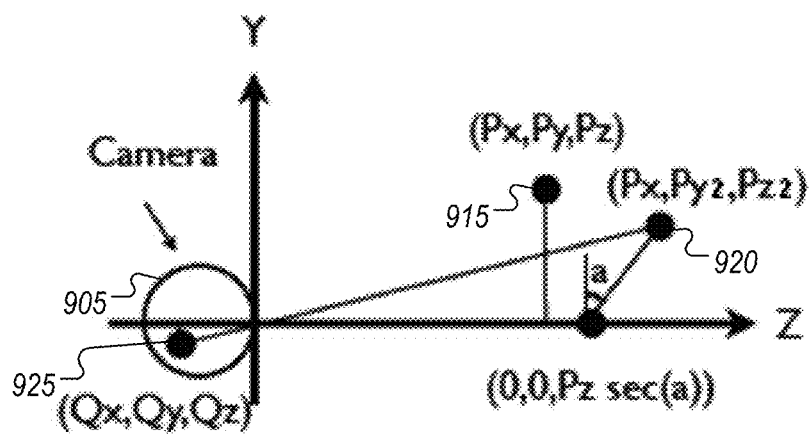

FIGS. 9A and 9B illustrate an example of the perspective distortion caused by the angle between a camera and a subject of a captured image. In FIG. 9A, a projected image in camera 905 includes an object representation 910 corresponding to an object 915. Camera 905 is tilted up and positioned lower than object 915 by an angle a. Further, the x-axis is perpendicular to the Y-Z plane and object 915 includes a point having the coordinates ($P_x,P_y,P_z$). The angle between the camera and the object causes a particular amount of distortion in the projected image.

In FIG. 9B, camera 905 is shown remapped to a position at which an undistorted image would be produced, thus indicating the amount of perspective distortion attributable to the angle between camera 905 and object 915, i.e., the angle a. A point ($Q_x,Q_y,Q_z$) in object representation 910 can be mapped to a point 920 in the shifted representation object 915 having the coordinates ($P_x,P_{y2},P_{z2}$). The value of $P_{z2}$ increases as the angle a increases from 0 degrees to 90 degrees. Thus, for a face centered at the point (0, 0, $P_{z2}$), the distortion will cause the upper portion of the face to become smaller and the lower portion of the face to become larger. The distortion can be corrected, however, by inversely mapping the distorted coordinate onto a corresponding undistorted coordinate. For example, the value of the coordinates $Q_x$ and $Q_y$ at the remapped position of the object representation 925 can be given by:

$$Q_x = Q_z \frac{P_x}{P_{z2}} = Q_z \frac{P_x}{P_y \sin(a) + P_z \sec(a)}$$

$$Q_y = Q_z \frac{P_{y2}}{P_{z2}} = Q_z \frac{P_y \cos(a)}{P_y \sin(a) + P_z \sec(a)}$$

Thus, warping techniques can be applied to an image captured by camera 905 to correct the distortion resulting from the angle of camera 905 with respect to object 915.

Figure 10:
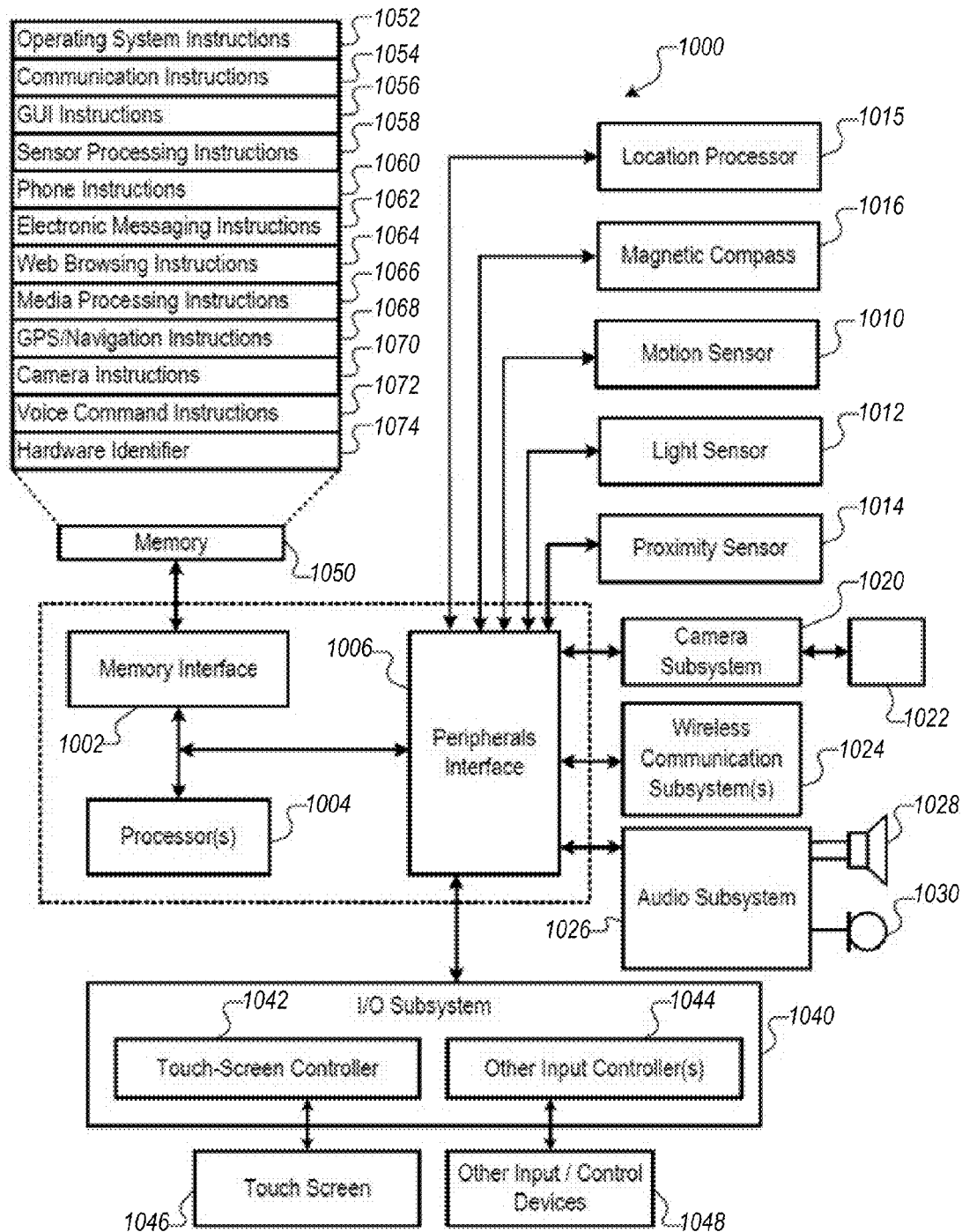
FIG. 10 is a block diagram of an example mobile computing device architecture.

FIG. 10 is a block diagram of an example mobile computing device architecture. Mobile computing device 1000, which can be an implementation of mobile phone 105, can include a memory interface 1002, one or more data processors, image processors and/or central processing units 1004, and a peripherals interface 1006. Memory interface 1002, the one or more processors 1004 and/or peripherals interface 1006 can be separate components or can be integrated in one or more integrated circuits. Various components in mobile computing device 1000 can be coupled together by one or more communication buses or signal lines.

Sensors, devices, and subsystems can be coupled to peripherals interface 1006 to facilitate multiple functionalities. For example, a motion sensor 1010, e.g. a gyroscope and/or accelerometer, a light sensor 1012, and a proximity sensor 1014 can be coupled to the peripherals interface 1006 to facilitate the orientation, lighting, and proximity functions. Location processor 1015, e.g., a GPS receiver, can be connected to peripherals interface 1006 to provide geo-positioning. A magnetic compass integrated circuit 1016 also can be connected to peripherals interface 1006 to provide orientation, such as to determine the direction of due North.

Camera subsystem 1020 and optical sensor 1022, e.g. a charged coupled device (CCD) or a complementary metal-oxide semiconductor (CMOS) optical sensor, can be utilized to facilitate camera functions, such as capturing image and/or video data.

Communication functions can be facilitated through one or more wireless communication subsystems 1024, which can include radio frequency receivers and transmitters, and/or optical, e.g. infrared, receivers and transmitters. The specific design and implementation of communication subsystem 1024 can depend on the communication network(s) over which mobile communication device 1000 is intended to operate. For example, mobile communication device 1000 can include communication subsystems 1024 designed to operate over one or more of a GSM network, a GPRS network, an EDGE network, a Wi-Fi or WiMax network, and a Bluetooth™ network. In particular, wireless communication subsystems 1024 can include hosting protocols such that mobile communication device 1000 can be configured as a base station for other wireless devices.

Further, audio subsystem 1026 can be coupled to speaker 1028 and microphone 1030 to facilitate voice-enabled functions, such as voice recognition, voice replication, digital recording, and telephony functions. Also, I/O subsystem 1040 can include a touch screen controller 1042 and/or other input controller(s) 1044. For example, I/O subsystem 1040 can include a microphone (internal and/or external), a speaker, and a voice command recognition engine. I/O subsystem 1040 can receive voice commands and present audio outputs over a full duplex communication channel. For example, transport technologies other than regular cellular voice communications, such as voice over IP, can be implemented.

Touch-screen controller 1042 can be coupled, directly or indirectly, to touch screen 1046. Touch screen 1046 and touch screen controller 1042 can, for example, be adapted to detect contact and the movement or break thereof using any of multiple touch sensitivity technologies, including but not limited to capacitive, resistive, infrared, and surface acoustic wave technologies, as well as other proximity sensor arrays or other elements for determining one or more points of contact with touch screen 1046.

The other input controller(s) 1044 can be coupled to other input/control devices 1048, such as one or more buttons, rocker switches, thumb-wheels, infrared ports, USB ports, and/or a pointing device, such as a stylus. The one or more buttons (not shown) can include an up/down button for volume control of speaker 1028 and/or microphone 1030.

In one implementation, pressing a button for a first duration may disengage a lock associated with touch screen 1046 and pressing the button for a second, e.g. longer, duration can be configured to cycle power to mobile computing device 1000. Further, functionality of one or more buttons can be customized. Touch screen 1046 can, for example, also be used to implement virtual or soft buttons and/or a keyboard.

In some implementations, mobile computing device 1000 can present recorded audio and/or video files, such as MP3, AAC, and MPEG files. In some implementations, mobile computing device 1000 can include the functionality of an MP3 player, such as an iPod Touch™.

Memory interface 1002 can be coupled to memory 1050, which can include high-speed random access memory and/or non-volatile memory, such as one or more magnetic disk storage devices, one or more optical storage devices, and/or flash memory (e.g., NAND, NOR). Memory 1050 can store an operating system 1052, such as Darwin, RTXC, LINUX, UNIX, OS X, WINDOWS, or an embedded operating system, such as VxWorks. Operating system 1052 can include instructions for handling basic system services and for performing hardware dependent tasks. In some implementations, operating system 1052 can be a kernel, such as a UNIX kernel.

Memory 1050 also can store communication instructions 1054 to facilitate communicating with one or more additional devices, one or more computers, and/or one or more servers. Memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; and voice command instructions 1072 to facilitate operation of mobile computing device 1000 using voice commands.

Memory 1050 also can store other software instructions (not shown), such as video conferencing (or video chat) instructions to facilitate video conferencing processes and functions; web video instructions to facilitate web video-related processes and functions; and/or web shopping instructions to facilitate web shopping-related processes and functions. In some implementations, media processing instructions 1066 are divided into audio processing instructions and video processing instructions to facilitate audio processing-related processes and functions and video processing-related processes and functions, respectively. An activation record and International Mobile Equipment Identity (IMEI) 1074 or similar hardware identifier also can be stored in memory 1050.

Each of the above identified instructions and applications can correspond to a set of instructions for performing one or more functions, features, and/or processes described above. These instructions need not be implemented as separate software programs, procedures, or modules. Memory 1050 can include additional instructions or fewer instructions. Furthermore, various functions of mobile computing device 1000 can be implemented in hardware and/or in software, including in one or more signal processing and/or application specific integrated circuits.

The techniques and functional operations described in this disclosure can be implemented in digital electronic circuitry, or in computer software, firmware, or hardware, including the structural means described in this disclosure and structural equivalents thereof, or in combinations of them. The techniques can be implemented using one or more computer program products, e.g., machine-readable instructions tangibly stored on computer-readable media, for execution by, or to control the operation of one or more programmable processors or computers. Further, programmable processors and computers can be included in or packaged as mobile devices.

The processes and logic flows described in this disclosure can be performed by one or more programmable processors executing one or more instructions to receive, manipulate, and/or output data. The processes and logic flows also can be performed by programmable logic circuitry, including one or more FPGAs (field programmable gate array), PLDs (programmable logic devices), and/or ASICs (application-specific integrated circuit). General and/or special purpose processors, including processors of any kind of digital computer, can be used to execute computer programs and other programmed instructions stored in computer-readable media, including nonvolatile memory, such as read-only memory, volatile memory, such as random access memory, or both. Additionally, data and computer programs can be received from and transferred to one or more mass storage devices, including hard drives, flash drives, and optical storage devices. Further, general and special purpose computing devices and storage devices can be interconnected through communications networks. The communications networks can include wired and wireless infrastructure. The communications networks further can be public, private, or a combination thereof.

A number of implementations have been disclosed herein. Nevertheless, it will be understood that various modifications may be made without departing from the spirit and scope of the claims. Accordingly, other implementations are within the scope of the following claims.

What is claimed is:

1. A method of reducing distortion in an image, the method comprising:
    receiving a captured image corresponding to a video sequence, the video sequence comprising one or more past images to the captured image and zero or more future images to the captured image;
    determining an orientation of a camera used to generate the captured image;
    computing a warp parameter based on the determined orientation of the camera;
    filtering the warp parameter in conjunction with either or both of past images and future images from the video sequence;
    computing an orientation indicator based, at least in part, on a difference between the determined orientation and a preferred orientation of the camera, wherein the orientation indicator indicates an orientation that, when applied to the camera, would orient the camera to more closely approximate the preferred orientation;
    applying, based on the filtered warp parameter, one or more warp techniques to the captured image to generate a distortion corrected image; and
    associating the orientation indicator with the distortion corrected image.

2. The method of claim 1, wherein the orientation indicator comprises an indicator that is: visual, auditory, haptic, or any combination thereof.

3. The method of claim 1, wherein the one or more warp techniques are only applied when one or more degrees of difference between the determined orientation of the camera and the preferred orientation of the camera exceeds a threshold value.

4. The method of claim 1, wherein the orientation indicator comprises at least one of the following: an identification of a direction of correction; and an identification of a magnitude of correction.

5. The method of claim 1, further comprising: filtering the sensor data.

6. The method of claim 1, further comprising: receiving sensor data associated with another image corresponding to the video sequence; and updating the filtered warp parameter, in accordance with the received sensor data, for use with the another image.

7. The method of claim 1, further comprising: receiving input identifying a face location in the captured image.

8. The method of claim 7, further comprising: applying the one or more warp techniques to the captured image in accordance with the identified face location.

9. The method of claim 7, wherein receiving input identifying a face location further comprises: receiving input defining a boundary corresponding to the face location.

10. A computer program product, encoded on a non-transitory computer-readable medium, operable to cause data processing apparatus to perform operations comprising:
    receiving a captured image depicting a face, wherein the captured image is generated by a camera and corresponds to a video sequence, the video sequence comprising one or more past images to the captured image and zero or more future images to the captured image;
    analyzing sensor data to determine an orientation of the camera;
    computing one or more warp parameters based on the determined orientation of the camera;
    filtering the one or more warp parameter in conjunction with either or both of past images and future images from the video sequence;
    computing an orientation indicator based, at least in part, on a difference between the determined orientation and a preferred orientation of the camera, wherein the orientation indicator indicates an orientation that, when applied to the camera, would orient the camera to more closely approximate the preferred orientation;
    warping at least a portion of the captured image, based on the filtered one or more warp parameters, to generate a distortion corrected image; and
    associating the orientation indicator with the distortion corrected image.

11. The computer program product of claim 10, wherein the orientation indicator comprises an indicator that is: visual, auditory, haptic, or any combination thereof.

12. The computer program product of claim 10, further operable to cause data processing apparatus to perform operations comprising: only warping the at least a portion of the captured image when one or more degrees of difference between the determined orientation of the camera and the preferred orientation of the camera exceeds a threshold value.

13. The computer program product of claim 10, further operable to cause data processing apparatus to perform operations comprising: receiving input from a face detection algorithm identifying a location of the depicted face; and warping the at least a portion of the captured image in accordance with the identified location of the depicted face.

14. The computer program product of claim 10, wherein the orientation indicator comprises at least one of the following: an identification of a direction of correction; and an identification of a magnitude of correction.

15. The computer program product of claim 10, further operable to cause data processing apparatus to perform operations comprising:
    analyzing sensor data associated with a headset worn by a user to determine an orientation of the camera relative to the user's face; and
    computing one or more warp parameters in accordance with the determined orientation of the camera relative to the user's face.

16. A system comprising:
    a camera configured to capture video images corresponding to a video sequence, the video sequence comprising one or more past images to the captured image and zero or more future images to the captured image;
    a position sensor; and
    a computing system coupled to the camera and the position sensor, the computing system including one or more processors configured to perform operations comprising:
        receiving, from the camera, a captured video image;
        receiving sensor data from the position sensor;
        analyzing the received sensor data to determine an orientation of the camera;
        computing a warp parameter based on the determined orientation of the camera;
        filtering the warp parameter in conjunction with either or both of past video images and future video images from the video sequence;
        computing an orientation indicator based, at least in part, on a difference between the determined orientation and a preferred orientation of the camera, wherein the orientation indicator indicates an orientation that, when applied to the camera, would orient the camera to more closely approximate the preferred orientation;

applying, based on the filtered warp parameter, one or more warp techniques to the captured video image to generate a distortion corrected image; and associating the orientation indicator with the distortion corrected image.

17. The system of claim 16, wherein the one or more processors are further configured to perform operations comprising: generating the distortion corrected image in real-time.

18. The system of claim 16, wherein the one or more processors are further configured to perform operations comprising: only applying the one or more warp techniques to the captured video image when one or more degrees of difference between the determined orientation of the camera and the preferred orientation of the camera exceeds a threshold value.

19. The system of claim 16, wherein the computing system further includes: a touch screen display configured to receive touch input from a user.

20. The system of claim 19, wherein the one or more processors are further configured to perform operations comprising: receiving, through the touch screen display, input identifying one or more locations on a face depicted in the captured video image.

21. The system of claim 20, wherein the one or more processors are further configured to perform operations comprising: applying the one or more warp techniques to the captured video image in accordance with the identified one or more locations on the face.

22. The system of claim 16, wherein the orientation indicator comprises at least one of the following: an identification of a direction of correction; and an identification of a magnitude of correction.

23. A method of reducing distortion in an image, the method comprising:

receiving a captured image corresponding to a video sequence, the video sequence comprising one or more past images to the captured image and zero or more future images to the captured image;

receiving sensor data from a position sensor associated with a camera used to generate the captured image;

identifying one or more registration points associated with the captured image;

comparing, based on the identified one or more registration points, the captured image with a reference image;

determining, in response to the comparing, one or more warp parameters;

filtering the one or more warp parameter in conjunction with either or both of past video images and future video images from the video sequence;

determining, based at least in part on the sensor data, an orientation indicator, wherein the orientation indicator indicates an orientation that, when applied to the camera, would orient the camera to more closely approximate a preferred orientation;

applying, based on the filtered one or more warp parameters, one or more warp techniques to the captured image to generate a distortion corrected image; and associating the orientation indicator with the distortion corrected image.

24. The method of claim 23, further comprising: only applying the one or more warp techniques to the captured image when one or more degrees of difference between the sensor data and the preferred orientation exceeds a threshold value.

25. The method of claim 23, further comprising: adjusting the determined one or more warp parameters based on the received sensor data.

26. The method of claim 23, further comprising: selecting the reference image based on a resolution of the captured image.

27. The method of claim 23, further comprising: transmitting the distortion corrected image to a remote computing system.

28. The method of claim 23, wherein identifying one or more registration points further comprises: automatically identifying the one or more registration points based on facial detection processing.

29. The method of claim 23, wherein the orientation indicator comprises at least one of the following: an identification of a direction of correction; and an identification of a magnitude of correction.

30. The method of claim 23, wherein the reference image further comprises: a three-dimensional (3-D) reference model.

31. A computer program product, encoded on a non-transitory computer-readable medium, operable to cause data processing apparatus to perform operations comprising:

receiving a captured image depicting a face, wherein the captured image corresponds to a video sequence, the video sequence comprising one or more past images to the captured image and zero or more future images to the captured image;

receiving sensor data from a position sensor associated with a camera used to generate the captured image;

identifying one or more registration points associated with the captured image;

comparing, based on the identified one or more registration points, the captured image with the reference image;

determining, in response to the comparing, one or more warp parameters;

filtering the one or more warp parameter in conjunction with either or both of past video images and future video images from the video sequence;

determining, based at least in part on the sensor data, an orientation indicator, wherein the orientation indicator indicates an orientation that, when applied to the camera, would orient the camera to more closely approximate a preferred orientation;

applying, based on the filtered one or more warp parameters, one or more warp techniques to the captured image to generate a distortion corrected image; and associating the orientation indicator with the distortion corrected image.

32. The computer program product of claim 31, wherein the orientation indicator comprises at least one of the following: an identification of a direction of correction; and an identification of a magnitude of correction.

33. The computer program product of claim 31, further operable to cause data processing apparatus to perform operations comprising: presenting the distortion corrected image to a user as a preview image.

34. The computer program product of claim 31, further operable to cause data processing apparatus to perform operations comprising: only applying the one or more warp techniques to the captured image when one or more degrees of difference between the sensor data and the preferred orientation of the camera exceeds a threshold value.

* * * * *

UNITED STATES PATENT AND TRADEMARK OFFICE
CERTIFICATE OF CORRECTION

PATENT NO. : 8,599,238 B2  Page 1 of 1
APPLICATION NO. : 12/581043
DATED : December 3, 2013
INVENTOR(S) : Hsi-Jung Wu et al.

It is certified that error appears in the above-identified patent and that said Letters Patent is hereby corrected as shown below:

In the Claims

Col. 20, line 8, replace "parameter" with --parameters--.

Col. 21, line 50, replace "parameter" with --parameters--.

Col. 22, line 38, replace "parameter" with --parameters--.

Signed and Sealed this
Eighteenth Day of February, 2014

Michelle K. Lee
*Deputy Director of the United States Patent and Trademark Office*